United States Patent [19]
Baranovsky et al.

[11] Patent Number: 5,897,661
[45] Date of Patent: Apr. 27, 1999

[54] LOGICAL VOLUME MANAGER AND METHOD HAVING ENHANCED UPDATE CAPABILITY WITH DYNAMIC ALLOCATION OF STORAGE AND MINIMAL STORAGE OF METADATA INFORMATION

[75] Inventors: Leon Daniel Baranovsky, Campbell, Calif.; Luis Felipe Cabrera, Medina, Wash.; Chiehshow Chin, Sunnyvale; Robert Rees, Los Gatos, both of Calif.

[73] Assignee: International Business Machines Corporation, Armonk, N.Y.

[21] Appl. No.: 08/806,180

[22] Filed: Feb. 25, 1997

[51] Int. Cl.[6] .............................. G06F 12/00; G06F 12/02
[52] U.S. Cl. .............................. 711/170; 711/173; 711/4; 711/112; 707/205
[58] Field of Search .................................... 711/112, 113, 711/114, 4, 170, 173; 395/182.04, 182.05; 707/200, 205

[56] References Cited

U.S. PATENT DOCUMENTS

| | | | |
|---|---|---|---|
| 5,129,088 | 7/1992 | Auslander et al. | 395/700 |
| 5,403,639 | 4/1995 | Belsan et al. | 711/114 |
| 5,430,855 | 7/1995 | Walsh et al. | 395/275 |
| 5,435,004 | 7/1995 | Cox et al. | 395/575 |
| 5,761,526 | 6/1998 | Sakakura et al. | 711/114 |

FOREIGN PATENT DOCUMENTS 0482853  10/1991  European Pat. Off. .

*Primary Examiner*—Glenn Gossage
*Attorney, Agent, or Firm*—Gray Cary Ware Freidenrich

[57] ABSTRACT

An apparatus, a method, and a computer program product conceptually provide a logical unit of undivided data storage that spans physical storage device boundaries. The apparatus manages the logical unit of undivided storage using metadata information stored on the physical storage devices. Advantageously, the apparatus replicates a minimum portion of the metadata information across all of the data storage devices and favors writing metadata only in the devices where the information is required to operate. In a preferred embodiment, a logical unit of undivided storage is created by defining a logical volume and allocating portions of available physical data storage devices thereto in order to provide a minimum logical volume size. Metadata is generated and stored on the data storage devices to provide detailed information about the portions of each data storage device that have been allocated to the logical volume. After initialization, the size of the logical volume can be automatically changed such that portions of the data storage devices are allocated to or deallocated from the logical volume. Following an allocation or deallocation operation, the metadata stored on the data storage devices is minimally updated only on the data storage devices affected by the operation. The metadata on unaffected storage devices is not changed such that processing time is improved. In another embodiment, the metadata may be differentiated into two types, global and local. Global metadata is maintained in a fully replicated way across all of the data storage devices. Local metadata containing information specific to a particular data storage device is maintained on that storage device but is not replicated on other storage devices. In this way, data storage space availability is improved. In still another embodiment, an in-memory data structure is constructed to maintain information derived from the stored local metadata. Full operation is possible despite failed or unavailable physical data storage devices.

30 Claims, 11 Drawing Sheets

LOGICAL VOLUME MANAGER AND METHOD HAVING ENHANCED UPDATE CAPABILITY WITH DYNAMIC ALLOCATION OF STORAGE AND MINIMAL STORAGE OF METADATA INFORMATION

BACKGROUND OF THE INVENTION

The present invention is directed generally to logical volume management of data storage resources in a data processing system, and more particularly, to improvements in the dynamic allocation and use of physical data storage devices containing portions of a logical unit of undivided storage.

Commonly assigned U.S. Pat. No. 5,129,088, entitled "Data Processing Method To Create Virtual Disks From Non-Contiguous Groups Of Logically Contiguous Addressable Blocks Of Direct Access Storage Device," and commonly assigned U.S. Pat. No. 5,435,004, entitled "Computerized System And Method For Data Backup," are directed to a system and method of logical volume management in which a plurality of physical partitions or clusters, each representing one or more blocks or sectors of a direct access storage device (DASD), are grouped together and called a physical volume. A plurality of physical volumes are grouped together and referred to as a physical volume group. When a group of related files is to be installed on the system, an aggregate of logically contiguous, undivided storage, known as a logical volume, is created. The logical volume includes a sequence of logical clusters that correspond to one or more of the physical clusters in one or more of the physical volumes of a single physical volume group. The physical clusters and volumes need not be physically contiguous and may even be located on different storage devices. Each logical volume is initially assigned a minimum number of physical clusters as required to store the file group. If additional physical clusters are required to increase the size of the logical volume, they can be added dynamically.

The notion of undivided, logically contiguous storage means that higher-level services (e.g. file systems, data base management systems and other data managers) are presented with a logical view of storage that masks physical device boundaries and provides extended storage attributes for performance and reliability. To the higher level services, it appears as if there is undivided, contiguous physical storage of variable size available. To administer this data storage scheme, the logical volume management system of U.S. Pat. Nos. 5,129,088 and 5,435,044 generates tables of metadata information and stores them on the physical storage devices. The metadata information defines the allocation of physical clusters, physical volumes and physical volume groups to the logical volumes and logical clusters. The metadata information includes information about each participating area of the physical devices. This information is fully replicated and stored on each participating physical device when the system is first initialized and whenever physical clusters are added to or removed from a logical volume.

One of the drawbacks of maintaining metadata information in a fully replicated way on each physical storage device comprising a logical unit of administration is that update performance is compromised because updating the metadata information across all of the participating physical devices consumes processor time. In addition, adverse space occupancy characteristics are experienced because the replicated metadata occupies disk space that could otherwise be used for data. Another drawback of full metadata replication is that the presence of failed or nonoperational devices degrades administrative and data access operations involving only operational devices. When administering a set of physical devices to form logical aggregates of undivided storage, there is the desire to have the data stored in them available to applications and data managers even in the presence of failed or unavailable physical devices. It is desirable to avoid operation in a degraded mode as a result of such non-operational devices. A degraded mode of operation could result if the logical volume management system sensed the presence of a failed or unavailable device during administrative or data access operations and either terminated the operation or proceeded with the operations using excessive error checking.

Accordingly, a need exists for a logical volume management scheme in which the foregoing disadvantages are overcome. What is required is a system and method that reduces the processing time required for administrative operations, increases available storage space, and provides normal administrative and data access operations to all parts of a logical unit of undivided storage that are present in operational devices, regardless of how many parts may be in non-operational devices.

SUMMARY OF THE INVENTION

In accordance with the foregoing objectives, the present invention replicates a minimum portion of the metadata information for a logical unit of undivided storage across all of the data storage devices utilized by the logical unit and favors writing metadata only in the devices where the information is required to operate. In a preferred aspect of the invention, which may be embodied in a data processing system, a data processing method or a computer program product, a logical unit of undivided storage is created by defining a logical volume and allocating portions of available physical data storage devices thereto in order to provide a minimum logical volume size. Metadata is generated and stored on the data storage devices to provide detailed information about the portions of each data storage device that have been allocated to the logical volume. After system initialization, the size of the logical volume can be dynamically changed such that portions of the data storage devices are allocated to or deallocated from the logical volume. Following an allocation or deallocation operation, the metadata stored on the data storage devices is minimally updated only on the data storage devices containing portions affected by the operation. The metadata on unaffected storage devices is not changed such that processing time is improved. In another aspect of the invention, the metadata may be differentiated into two types, global and local. Global metadata is maintained in a fully replicated way across all of the data storage devices. Local metadata containing information specific to a particular data storage device is maintained on that storage device but is not replicated on other storage devices. In this way, data storage space availability is improved. In still another aspect of the invention, an in-memory data structure is constructed to maintain information derived from the stored local metadata. Full operation is possible despite failed or unavailable physical data storage devices.

It is therefore an object of the present invention to manage a logical unit of undivided storage using minimum storage space for system metadata.

It is a further object of the present invention to update system metadata using minimum processor overhead.

It is a still further object of the present invention to update system metadata using simpler processing methodology.

It is a still further object of the present invention to administer large sets of data storage devices without adverse performance costs.

It is a still further object of the present invention to allow data in a storage device containing parts of a logical unit of undivided storage to be available whenever the device is available without requiring that other storage devices of the logical unit of undivided storage containing related data be available.

It is a still further object of the present invention to allow storage space administration activities directed to data residing in operational storage devices of a logical unit of undivided storage to proceed normally, even if some storage devices that contain parts of the logical unit of undivided storage are unavailable.

It is a still further object of the present invention to detect when a logical unit of undivided storage is incomplete due to an unavailable device, and to report these errors back to the requester of the data.

BRIEF DESCRIPTION OF THE DRAWINGS

The objects, advantages and features of the present invention will be more clearly understood by reference to the following detailed disclosure and the accompanying drawings in which.

DETAILED DESCRIPTION OF THE PREFERRED EMBODIMENTS

To aid in the understanding of the present invention reference is made to the aforementioned U.S. Pat. Nos. 5,129,088 and 5,435,004, the disclosures of which are fully incorporated herein by this reference. Those patents describe concepts of logical volume management in the context of an operating system such as UNIX (Trademark of UNIX Systems Laboratories, Inc., C/O Novell, Inc./SoftSolutions Technology, Provo, Utah, U.S.A.) or an AIX (Trademark of International Business Machines Corporation, Armonk, N.Y.) executing on a programmed, general purpose digital computer such as a work station machine like the RS/6000 or the PC RT (Trademarks of International Business Machines Corporation). For convenience, the following detailed description also assumes a UNIX-like implementation running on a workstation machine, but it is to be understood that the concepts of the present invention are in no way limited to any specific operating system or computer platform. For example, it is contemplated that the present invention could be advantageously implemented in the OS/2 Warp operating system running on a personal computer such as the PC AT or the APTIVA (Trademarks of International Business Machines Corporation). Other operating systems and personal computer machines could no doubt also be used to implement the present invention. These machines could be operated on a stand-alone basis or within a network environment of any size and configuration.

Figure 1:
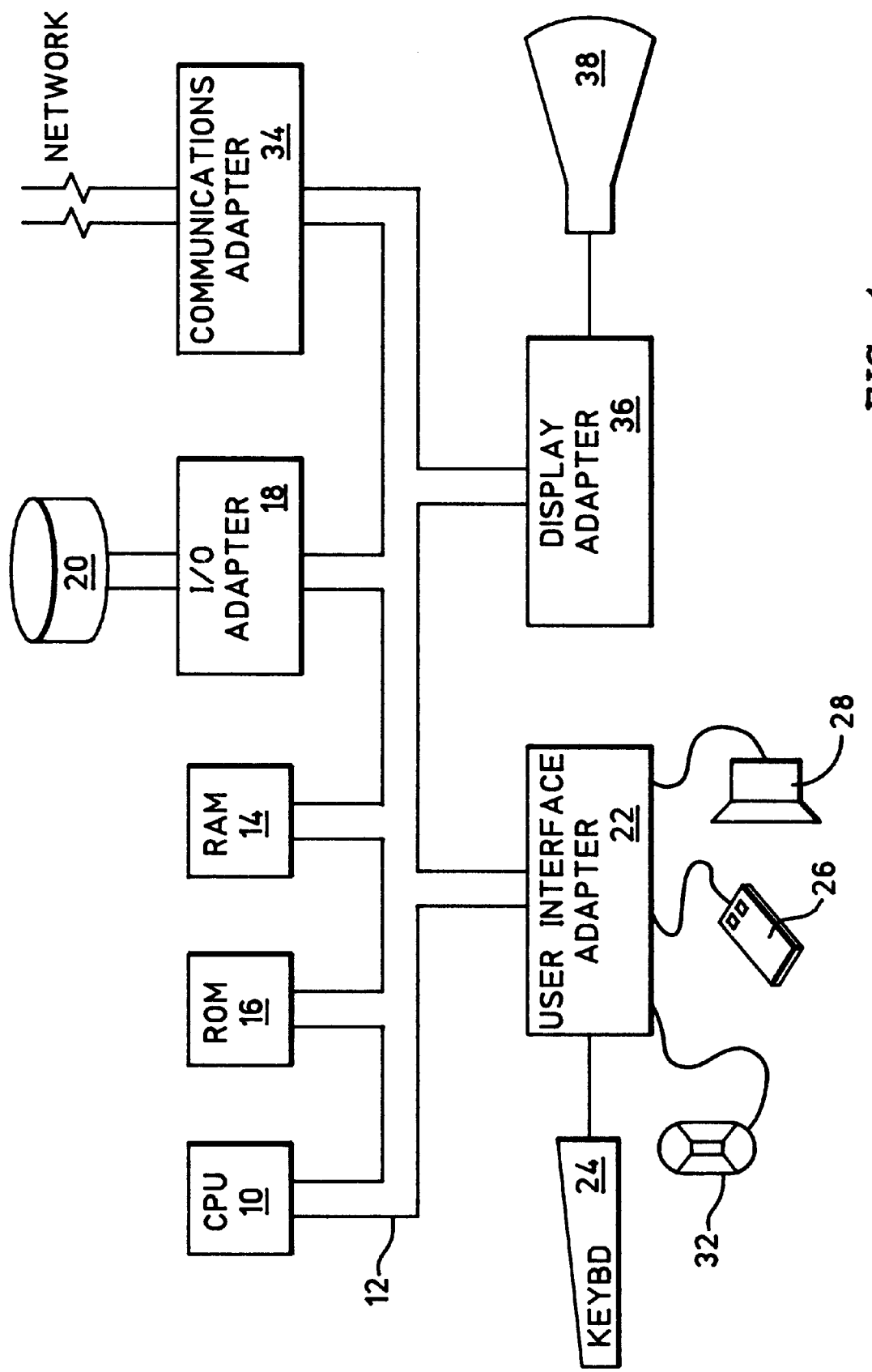
FIG. 1 is a functional block diagram of a programmed, general purpose digital computer configured according to the present invention.
Figure 19:
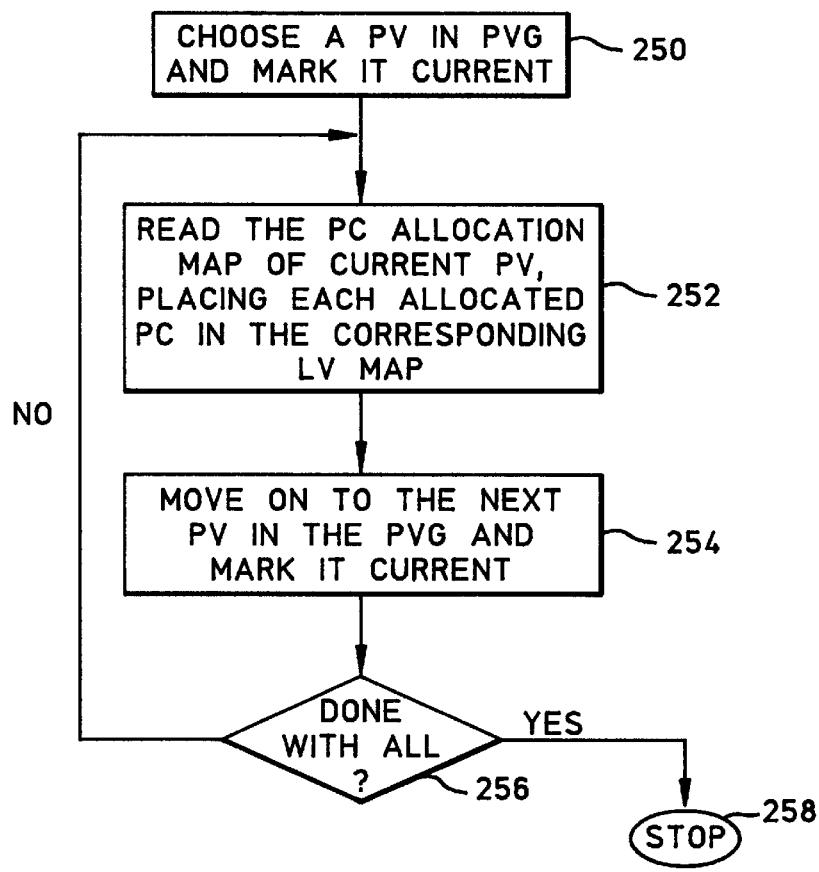
FIG. 19 is a flow chart illustrating processing steps taken during system initialization to build the logical cluster map data structure of FIG. 17.
Figure 20:
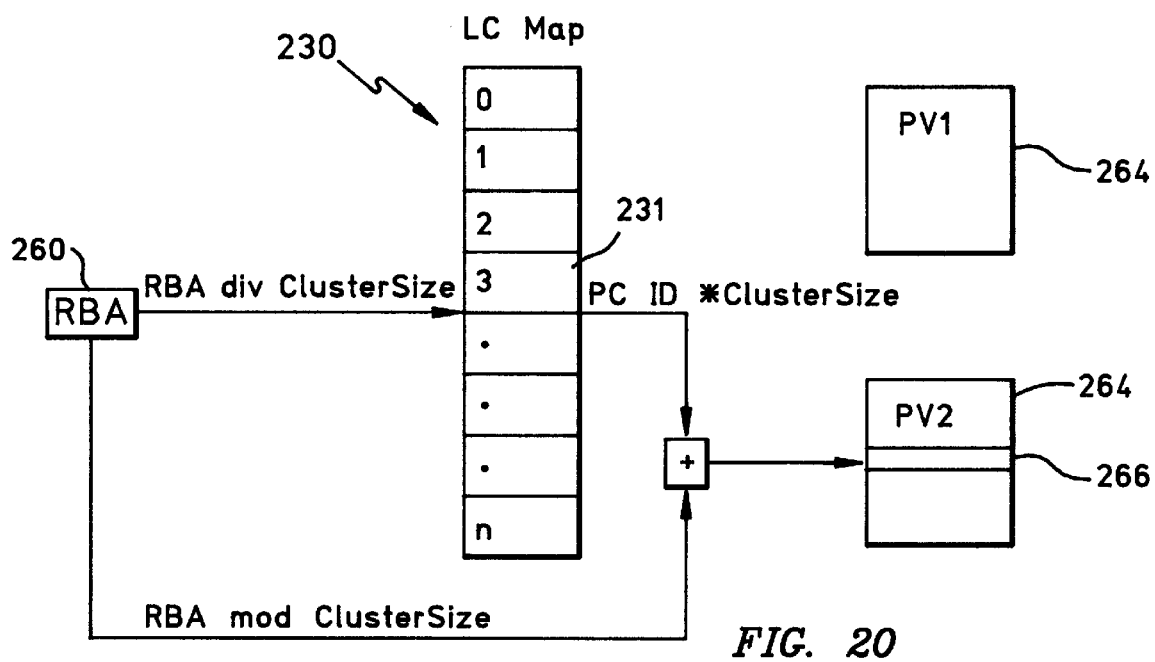
FIG. 20 illustrates a sector translation table data structure maintained in volatile memory in accordance with the present invention.
Figure 21:
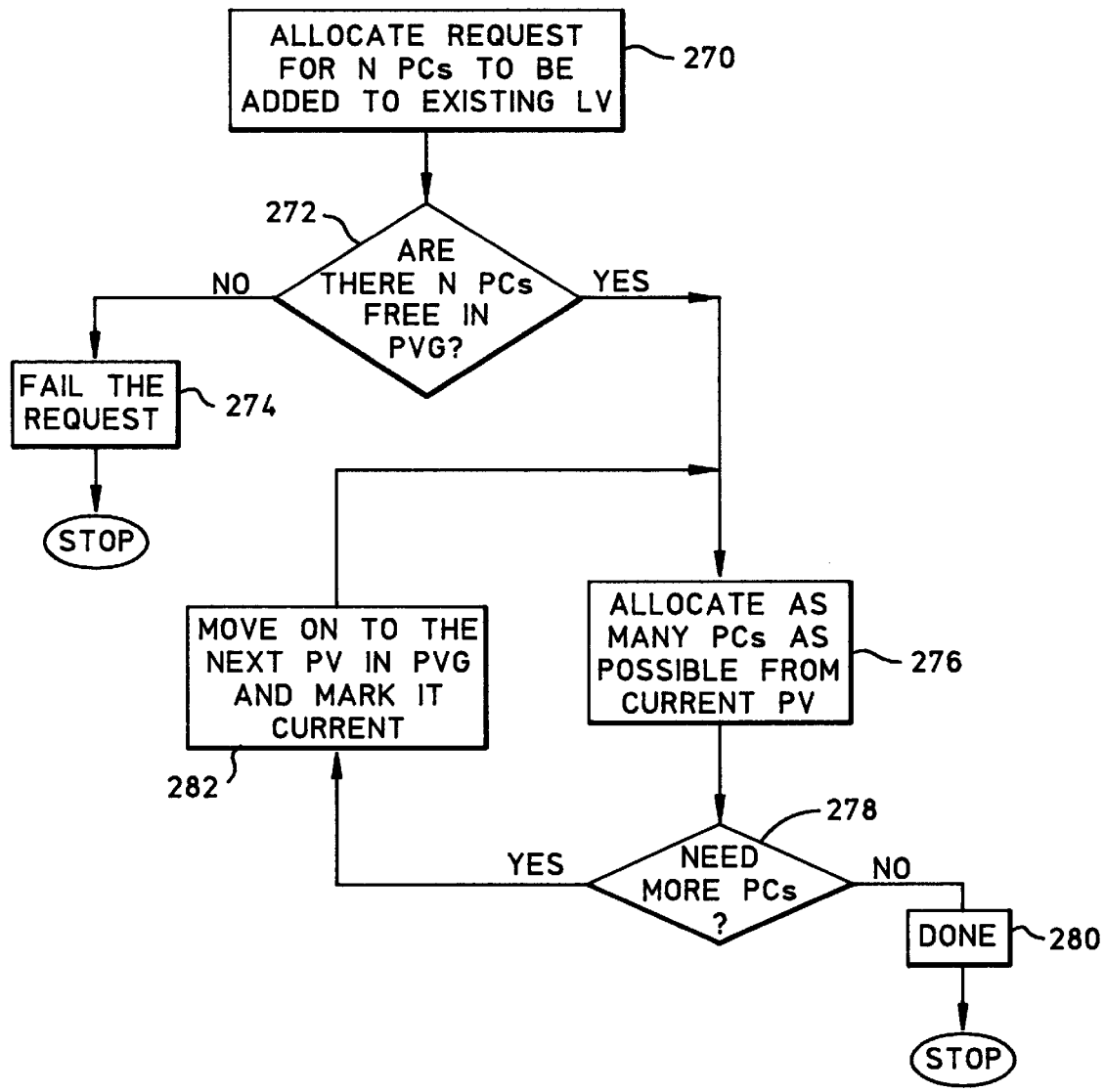
FIG. 21 is a flow chart illustrating processing steps involved in changing the size of a logical unit of undivided storage in accordance with the present invention.

Referring now to FIG. 1, there is illustrated an exemplary programmed, general purpose digital computer that performs data processing under control of the program illustrated in FIGS. 19–21, thereby executing computer program steps embodying operations of the invention. The digital computer includes a CPU 10, a read only memory (ROM) 16, a random access memory (RAM) 14, an input/output (I/O) adapter 18, a DASD 20, a user interface adapter 22 having attached thereto a keyboard 24, a mouse 26, a speaker 28 and a joystick 32, a communications adapter 34, and a display adapter 36, all interconnected via a common address/data/control path or bus 12. Each of the above components accesses the common bus 12 utilizing conventional techniques known to those skilled in the art, and includes such methods as dedicating particular address ranges to each component in the system, with the CPU being the busmaster. Other conventional techniques known to those skilled in the art employed in the system of FIG. 1 include direct memory access (DMA) used to transfer data at high speed from external devices such as the DASD 20 or the network shown to the RAM 14.

As is further shown in FIG. 1, the external devices such as the DASD 20 interface to the common bus 12 through respective adapters such as the I/O adaptor 18. Other external devices, such as the display 38 similarly use their respective adapters such as the display adapter 36 to provide data flow between the bus 12 and the display 38 or other device. Various user interface components provided for interconnection and use with the user interface adapter 22 include the aforementioned input devices; namely the joy stick 32, the mouse 26, the keyboard 24, and the speaker 28. Each of these units is well known as such and accordingly need not be described in detail herein.

As will be hereinafter detailed, upon loading of an appropriate program, such as that described herein with reference to FIGS. 19–21, from a data storage medium such as the DASD 20 into a program memory such as the RAM 14, the digital computer of FIG. 1 will execute the program in order to effect the desired logical volume management functions in accordance with the invention on a storage device such as the DASD 20.

In the preferred embodiment, the digital computer of FIG. 1 can be operated under the control of an operating system such as UNIX or AIX, as explained above. One function of such an operating system is to logically subdivide the DASD 20 into file systems comprising smaller storage disks. Such systems, in a conventional manner, are employed to store data files, executable programs, and the like. One characteristic of such systems is that it is often difficult to increase the size of a file system after the system is in use and the need for increased size becomes apparent. Nor is it easy to reduce the size of a file system in order to free up data storage space. An additional limitation associated with a UNIX operating system is that the file systems typically may not span more than one physical disk drive.

In addressing these inadequacies of prior file systems, the concept of a logical volume manager (LVM) was provided in the AIX operating system and is described in the aforementioned U.S. Pat. Nos. 5,129,088 and 5,435,004. The function of a logical volume manager is to organize or partition into equal-sized physical partitions or clusters a plurality of physical disk drives, with the collection of physical clusters conceptually being equivalent to a file system, and being referred to as a logical volume (LV). In this manner, a logical volume may include such physical clusters from multiple different disk units in the system of FIG. 1 and, accordingly, such logical volume may be larger than any individual disk unit. Moreover, in addressing the prior problem of a fixed file system size, in the LVM approach, additional physical clusters may be added as required to the logical volume without disrupting operation or requiring alteration of other physical clusters.

Figure 2:
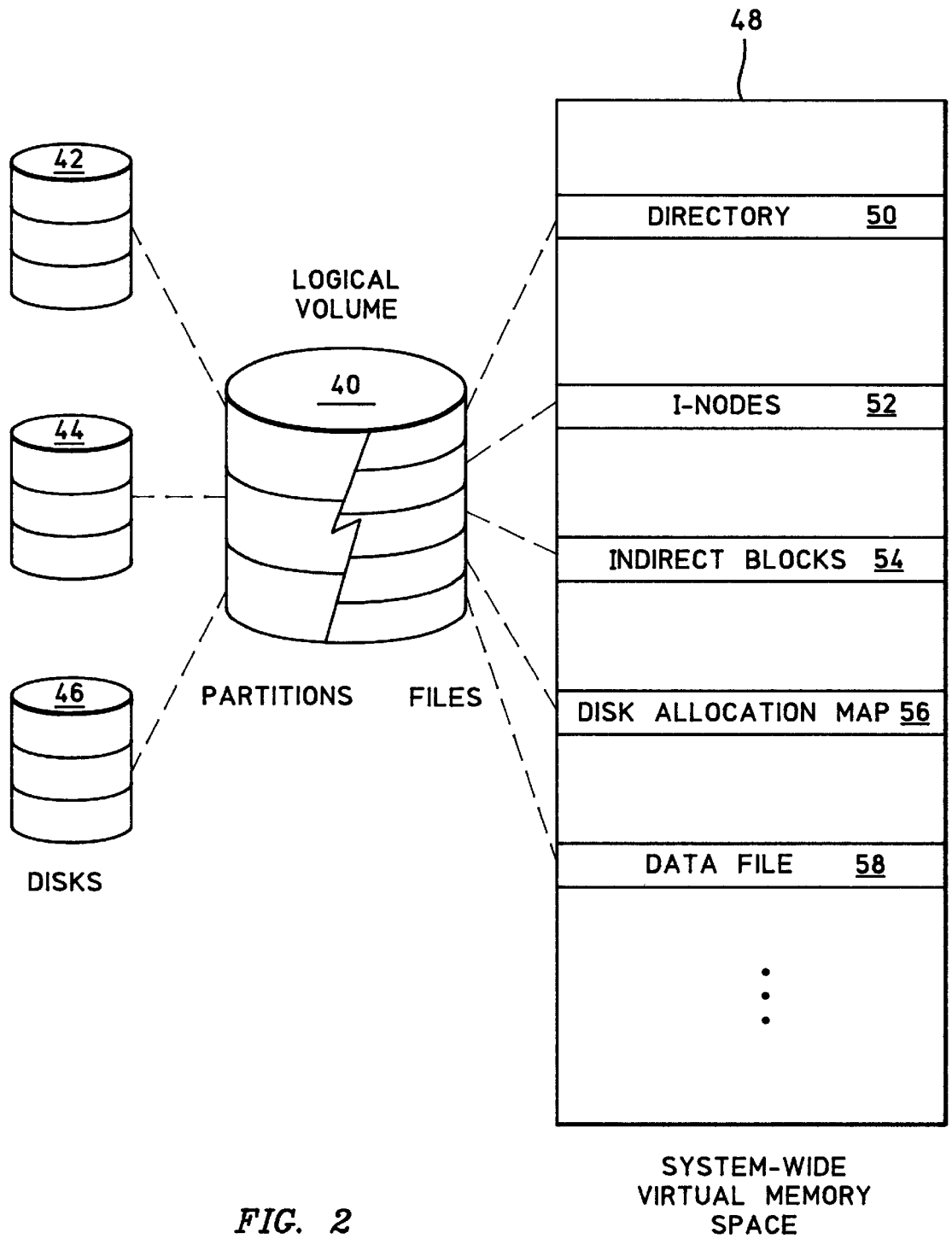
FIG. 2 is an illustration of a file system in a logical volume in virtual memory as may be employed in accordance with the present invention.

Referring to FIG. 2, an illustration is provided of a logical volume 40 as might be implemented by a logical volume manager of the present invention. The logical volume spans multiple physical disk drives 42–46 of the DASD 20, each containing multiple disks or platters. Each disk drive containing a group of multiple disks constitutes a physical volume. On the device side of the logical volume 40, physical storage space is allocated as a plurality of equal size logical clusters which may be located in multiple physical volumes constituting a physical volume group. To implement this allocation, each disk drive representing a physical volume contains metadata describing the identity of the physical volume, the physical volume group it is a part of, the logical volumes that are in the physical volume and the logical clusters that belong to each logical volume.

On the system side of the logical volume, storage is allocated to a plurality of related files in a file system defined within a system-wide virtual memory space 48. In the preferred embodiment employing a version of the UNIX operating system, a file in such a system is an unstructured byte string stored in a set of not necessarily adjacent disk blocks. File system metadata (I-nodes, indirect blocks, and directories) are used to find and access files. A directory 50, is a file which contains pairs of the form (Filename, I-node location) organized for searching by file name. An I-node, 52, is a small block that contains information such as file owner, access permissions, file size and the locations of a few data blocks for a small file. Larger files have a tree of indirect blocks, 54, rooted in I-nodes, which contain the data block locations. The logical volume 40 of FIG. 2 will include a disk allocation map 56, various data files 58, and such directories, I-nodes, etc. collectively forming the system-wide virtual memory space 48.

Figure 3:
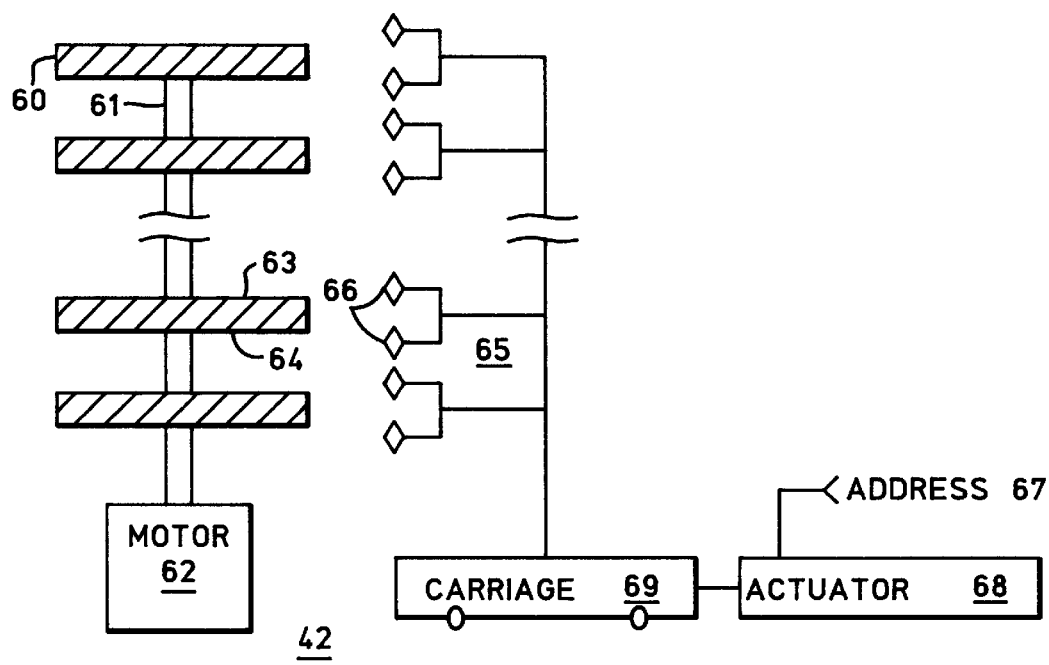
FIG. 3 is a diagrammatic illustration of a disk file storage device shown functionally in FIG. 1.

Referring now to FIG. 3, the disk drive 42 of FIG. 2 (as well as disk drives 44 and 46), in practice comprise a plurality of individual disks, as stated above. The device shown in FIG. 3 comprises a plurality of circular magnetic disks 60 which are mounted on a shaft 61 that is rotated at constant speed by a motor 62. Each surface 63 and 64 of the disk 60 is coated with a magnetic material and has a plurality of concentric magnetic tracks. The disk drive 42 further includes a mechanism 65 for positioning a plurality of magnetic transducers 66, one of each being associated with one surface, conjointly to one of the concentric recording track positions in response to an address signal 67 supplied to an actuator 68 attached to move a carriage 69. One recording track on each surface of each disk belongs to an imaginary cylinder of recording tracks that exist at each track position.

The physical address to the disk drive 42 conventionally takes the form of a five byte address designated "CCHS" where CC represents the cylinder or track number, H represents the number assigned to the magnetic head or transducer, which also corresponds to the disk surface because there is one head per surface, and S represents the sector or block number of a portion of the track. The block (sector) is established as the smallest unit of data that can be addressed on the device. In an exemplary disk drive, a block consists of 512 byte storage positions and there are 36 blocks per track. For system addressing purposes, the blocks in a file can be numbered sequentially starting at 0 and a conversion made from a block number address to a real physical CCHS address by simple mathematical calculation. From a programming standpoint, a disk drive is often referred to as a physical volume, as described above in relation to FIG. 2, and is viewed as a sequence of disk blocks. A physical volume has one device address and cannot include two separate disk drives because each disk drive has a separate accessing mechanism and requires a unique address.

Figure 4:
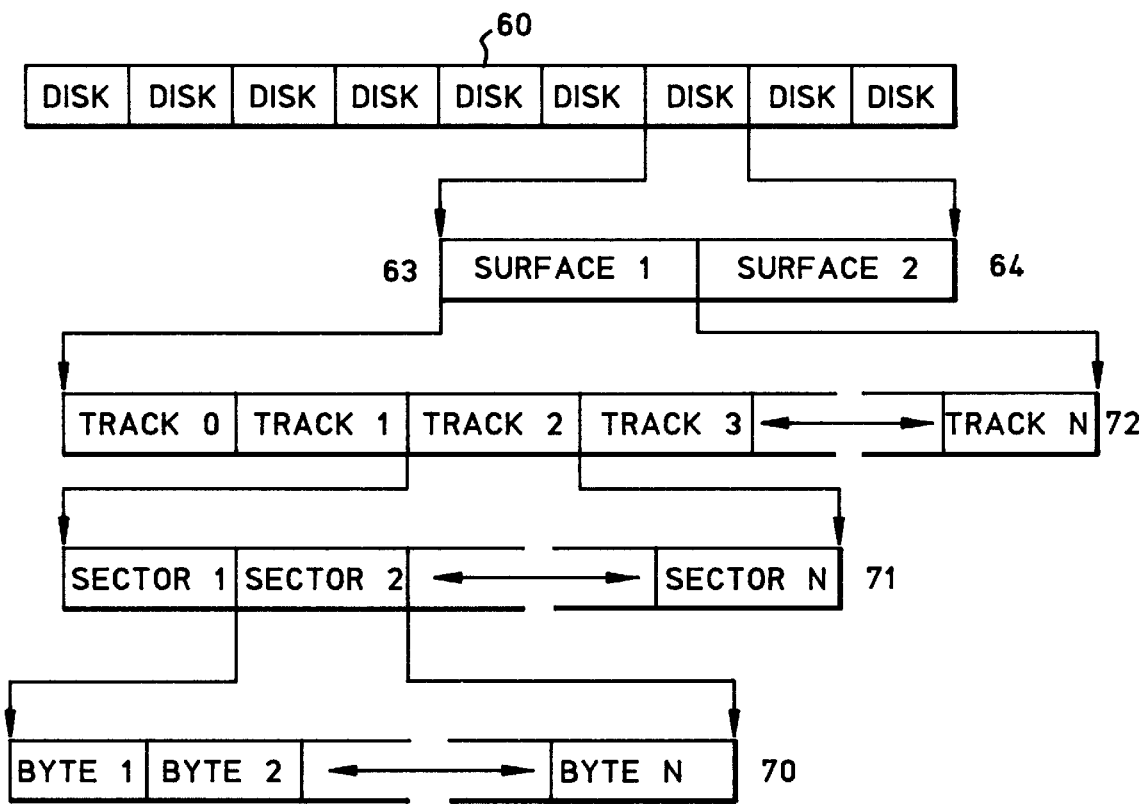
FIG. 4 is a diagram illustrating the physical relationship of various physical storage components employed in the real addressing architecture of a disk file.

FIG. 4 illustrates the physical relationship of the various storage elements involved in the addressing architecture of a disk drive, which to a large extent is generally standardized in the industry. Each byte position 70 stores one byte of data. A sector or block 71 comprises a specified plurality of sequential byte positions, 512 in number for example, and is the lowest level of an addressable element. Blocks 71 are combined into tracks 72, which are combined into surfaces 63 and 64, which are combined into disks 60, which are combined into disk drives 42. If more than one disk drive is employed, the combination of two or more disk drives is referred to a physical string of disk drives. In practice, a disk drive 42 may have one or more sectors or blocks 71 having a number of defects sufficient to render the block unusable.

Each physical volume, for example, each separate disk drive, reserves an area of the volume for storing information that is used by the system when the power is first turned on. This is now a standard convention in the industry where, for example, tracks or cylinders 0–4 are reserved for special information. Each physical volume reserves at least two cylinders for special use. In addition, some area of a physical volume may be reserved for holding boot code, from which a system boots or starts up. The boot code may be used too load diagnostics software, or the kernel of the operating system. The first reserved cylinder is cylinder 0, the first cylinder on any volume. Each physical volume uses the first four tracks of cylinder 0 to store various types of configuration and operation information about the DASD devices that are attached to the system. Some of this information is placed on the cylinder by the physical volume manufacturer, and some of it is written by the operating system on the first four tracks of cylinder 0. The second reserved cylinder on the physical volume is for the exclusive use of the Customer Engineer and is called the CE cylinder. This is always the last cylinder on the physical volume and is used for diagnostic purposes. The CE cylinder cannot be used for user data.

The boot code area and the non-reserved area are pointed to by the contents of an IPL (initial program load) Record interpreted in the context of the contents of a Configuration record. The IPL record consists of one block and contains information that allows the system to read the boot code (if any) and initialize the physical volume. The IPL Record can be divided into four logical sections. The first section is the IPL Record ID. The second section contains format information about the physical volume. The third section contains information about where the boot code (if any) is located and its length. The fourth section contains information about where the non-reserved area of the physical volume is located and its length.

The Configuration Record consists of one block and contains information required by the physical volume for all I/O operations other than reading the IPL Record, Configuration Record, or Backup Configuration Record. The Configuration Record fields include such items as the Configuration Record ID, the number of sectors available after formatting, the interleave factor to be used to read anything other than the IPL Record, the Configuration Record, or the Backup Configuration Record, the number of bytes per sector used to read anything other than the IPL Record, the Configuration Record or the Backup Configuration Record. A bad block directory is also provided to keep a record of the blocks that have been diagnosed as unusable. One track is also reserved for the Power On System Test (POST) control block that is created in memory during system initialization.

Figures 5, 6:
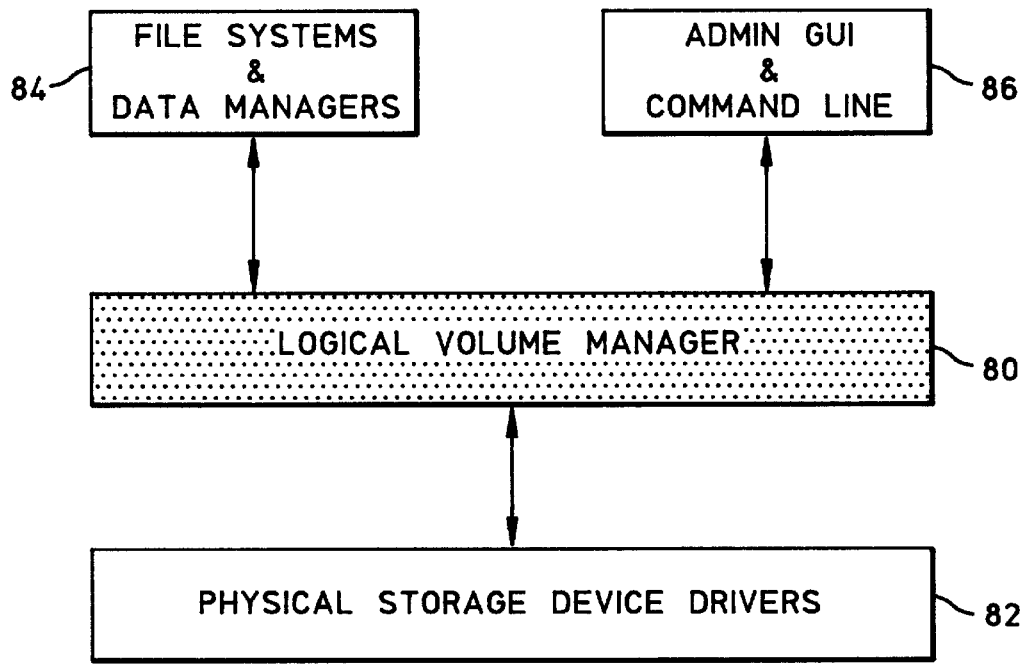
FIG. 5 is a functional block diagram showing a logical volume manager in accordance with the present invention and its interfacing relationship between physical storage devices and higher level services.
FIG. 6 illustrates a logical volume manager metadata table formed as a sequence of sectors recorded in a reserved area of a data storage device in accordance with the present invention.

Turning now to FIG. 5, a block diagram representation of a logical volume manager (LVM) 80 is shown. The LVM 80 contains program code in accordance with the present invention which is incorporated in the operating system kernel. Preferably, this LVM code operates at a system level above the traditional operating system physical storage device drivers, shown by block 82, and below higher-level services such as file systems and data managers, shown by block 84, and administrative GUI and command line interface facilities, shown by block 86. The LVM 80 is preferably implemented as an extension of the operating system that administers storage on behalf of the higher-level services. It presents a logical view of storage which masks physical device boundaries and provides extended storage attributes for performance and reliability, including mirroring and striping. As described in detail in U.S. Pat. No. 5,435,004, previously incorporated by reference herein, the LVM may include a logical volume manager pseudo device driver (LVDD) providing the same character and block entry points to subsystems and kernel components as a physical disk device driver, an LVM subroutine interface library providing routines that facilitate communication between system management applications and the LVDD, and an LVM daemon providing services to the LVDD and the LVM subroutine library. The LVM 80 allows file systems to be dynamically resized and relocated, span multiple physical volumes, and have their contents replicated for greater availability. The LVM 80 also provides bad block relocation.

The LVM 80 manages collections of read-write physical disks previously described as physical volumes or PVs. The disk drives constituting physical volumes (PVs) are physically attached to the computer (as opposed to diskettes, CD-ROMs and network-attached devices). The LVM 80 exports five data storage abstractions which provide a view of the underlying physical storage.

The first data storage abstraction presented by the LVM 80 is the physical volume (PV) itself. A physical volume (PV) consists of one or more LVM managed partitions known as physical clusters (PCs). The LVM 80 only administers the portions of the disk designated as LVM managed via the system's FDISK utility.

The second data storage abstraction used by the LVM 80 is the physical volume group or PVG. A physical volume group (PVG) is a named collection of one or more physical volumes (PVs). The physical volumes (PVs) exclusively owned by a respective physical volume group (PVG) need not be of the same type or size. Each physical volume (PV) within a physical volume group (PVG) has a unique identity within the PVG. The physical volume group (PVG) provides for portability of physical storage across systems and contains attributes that are common to all objects within the PVG.

The third data storage abstraction provided by the LVM 80 is the physical cluster or PC. Within each physical volume group (PVG), all the constituent physical volumes (PVs) are logically subdivided into physical clusters (PC) representing a number of equally sized contiguous units of storage space. A physical cluster (PC) is the smallest unit of disk space allocation, and is a contiguous space on a physical volume (PV). The size of a physical cluster (PC) is the same on all physical volumes (PVs) within a physical volume group (PVG), and that size is determined when the PVG is created (typically varying as a power of two between 128K bytes and 256M bytes). For example, if a physical volume (PV) has 100 megabytes of capacity and the size of a physical cluster (PC) defined in the physical volume group (PVG) is 4 megabytes, the storage in the PV is expressed as a sequence of 25 PCs aligned one after the other.

The fourth data storage abstraction exported by the LVM 80 is the logical volume or LV. A logical volume (LV) is defined within a physical volume group (PVG) and constitutes a named linear address space comprising an extensible collection of physical clusters (PCs). A logical volume (LV) can exist within only a single physical volume group (PVG) but the physical clusters (PCs) assigned to the LV may come from one or more of the physical volumes (PVs) in the PVG. Indeed, the principal function of a logical volume (LV) is to provide the abstraction of an extensible, reliable disk volume that encompasses logical areas of storage that are larger than individual physical volumes (PVs). An example logical volume (LV) may be a 12 megabyte LV, designated LV1, in which two physical clusters (PCs) are allocated from a first physical volume, designated PV1, and one PC is allocated from a second physical volume, designated PV2. The size of the logical volume (LV) and the location of the physical clusters (PCs) that make up the LV may be changed while the system is running.

The fifth data storage abstraction created by the LVM 80 is the logical cluster or LC. In the above example, when the physical clusters (PCs) from PV1 and PV2 are allocated to LV1, they become logical clusters or LCs. A logical cluster (LC) typically includes a corresponding physical cluster (PC) and two redundant copies of the PC known as mirrors. Each constituent physical cluster (PC) in a logical cluster (LC) is in one of two states—either valid (meaning that it has a valid copy of the data for this LC) or stale (meaning that the data on the PC cannot be used). The process of changing the state of a physical cluster (PC) from stale to valid is called mirrored synchronization.

A logical volume (LV) is thus a collection of physical clusters (PCs) and their mirrors organized into logical clusters (LCs), and contained within a single physical volume group (PVG). The logical clusters (LCs) allocated to a logical volume (LV) are logically contiguous but there is no requirement that the constituent physical clusters (PCs) of the LV be physically contiguous or that they be contained on the same physical volume (PV). Thus, three logical clusters LC0, LC1 and LC2 of a logical volume designated LV1 may correspond, respectively, to physical clusters (PCs) on two distinct physical volumes (PVs) designated PV1 and PV2, and their mirrors. For example, LC0 may correspond to PC3 of PV1 (and its mirrors), LC1 may correspond to PC6 of PV2 (and its mirrors), and LC2 may correspond to PC1 of PV1 (and its mirrors). The initial allocation of physical clusters (PCs) to a logical volume (LV) is a policy decision made at a high level in the system management hierarchy reflected by the logical volume manager 80. It is usually based on a preselected size which has been determined to be minimally necessary for the data being stored on the logical volume (LV).

Initially, a physical volume group (PVG) is created on a specific physical volume (PV). Additional physical volumes (PVs) may be subsequently added to the physical volume group (PVG) to increase the pool of LVM managed storage available within the PVG. After the physical volume group (PVG) is created, logical volumes (LVs) can be defined and logical clusters (LCs) can be allocated to the LVs. The logical clusters (LCs) are backed by physical clusters (PCs) on one or more physical volumes (PVs) within the physical volume group (PVG).

The system configuration information (metadata) identifying a physical volume group (PVG), its constituent physical volumes (PVs) and physical clusters (PCs), and the logical volumes (LVs) and logical clusters (LCs) allocated from physical storage locations within the PVG, is recorded in reserved areas of the physical volumes (PVs) managed by the LVM 80. The LVM 80 also maintains data structures in RAM 14 which are constructed during system initialization (boot processing) from the metadata information stored in the physical volumes (PVs). In accordance with the invention, a minimum of metadata information is replicated across all of the physical volumes (PVs) such that available data storage space is increased and logical volume (LV) updates are expeditiously implemented. These tables and data structures, which are maintained by the LVM 80, are illustrated in FIGS. 6–18 and 20.

FIG. 6 illustrates the structure of a metadata table 90 as would be maintained on a physical volume (PV), preferably beginning in the first sector of the first LVM managed partition on the physical device. Each metadata table 90 represents a grid of metadata sectors arranged contiguously on a physical volume managed by the LVM. As described in more detail hereinafter, each metadata table 90 includes a physical volume (PV) map 92, a physical volume group (PVG) map 94, a logical volume symbolic name (LVN) map 96, a recovery log (LOG) map 98, a logical volume (LV) map 100, a physical cluster (PC) allocation map 102, a mirror write consistency (MWC) bit array map 104, and a sector relocation table (SRT) map 106.

The metadata that is fully replicated and globally stored across all physical volumes (PVs) in a physical volume group (PVG) consists of the PVG sector 94, the LVN sectors 96 and the LOG sectors 98. The metadata that is specific to each physical volume (PV), and is not fully replicated across all PVs, consists of the PV sector 92, the LV sectors 100, the PC sectors 102, the MWC array 104 and the SRT table 106.

Figure 7:
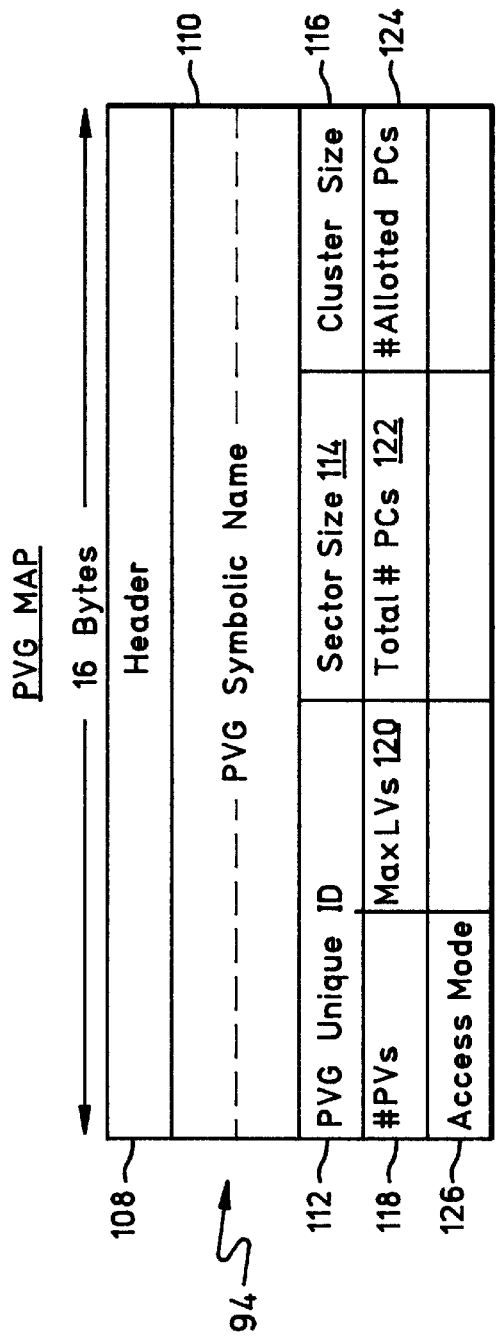
FIG. 7 illustrates a physical volume group portion of the metadata table of FIG. 6.

Referring now to FIG. 7, a fully replicated PVG metadata map 94 is illustrated. It includes a series of contiguous bytes containing identification information about a single physical volume group (PVG). The PVG map 94 includes a 16 byte header 108, a multi-byte PVG symbolic name identifier 110, an 8 byte PVG unique ID identifier 112, a 4 byte sector size identifier 114, a 4 byte cluster size identifier, a 4 byte identifier 118 specifying the number of physical volumes (PVs) in the PVG, a 4 byte identifier 120 specifying the maximum number of logical volumes (LVs) allowed for the PVG, a 4 byte identifier 122 specifying the total number of physical clusters (PCs) within the PVG, a 4 byte identifier 124 specifying the number of PCs allocated to logical volumes, and a 4 byte identifier 126 specifying the access mode available for reading/writing data within the PVG.

Figure 8:
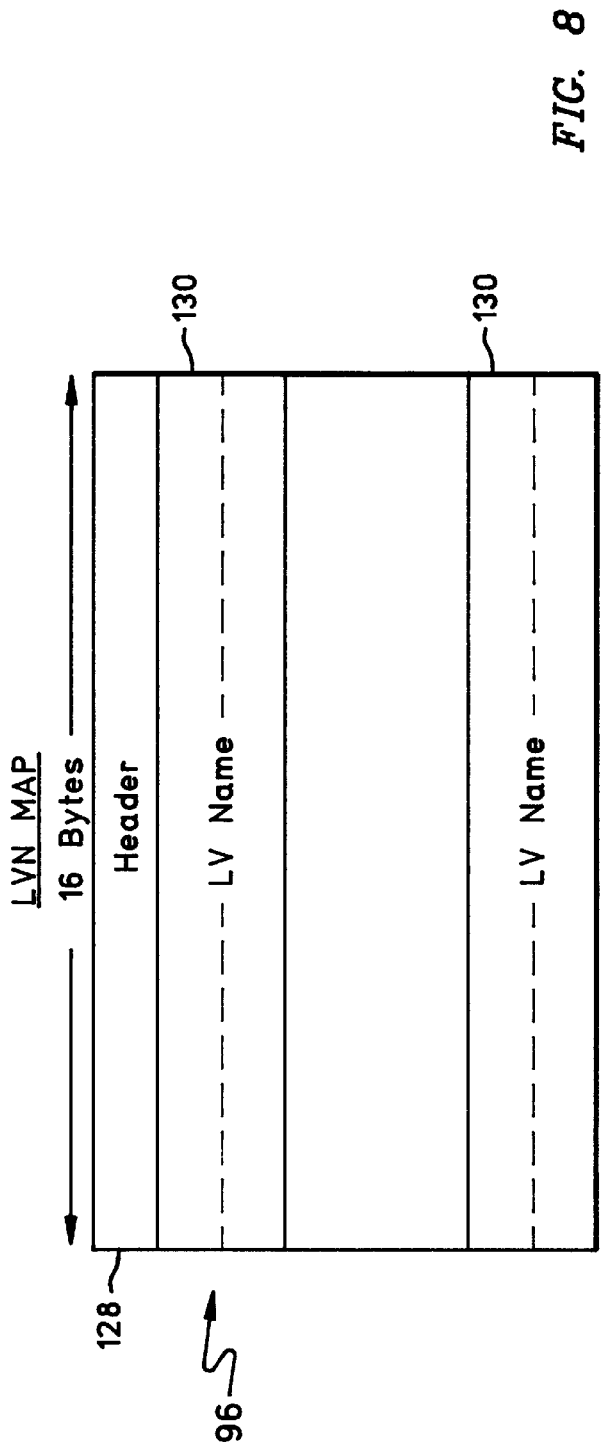
FIG. 8 illustrates a logical volume symbolic name portion of the metadata table of FIG. 6.

Referring now to FIG. 8, a fully replicated LVN metadata map 96 is illustrated. In the metadata table 90, the LVN map 96 extends over one or more contiguous sectors of disk space. The LVN map 96 includes a 16 byte header 128 and one or more multi-byte symbolic logical volume (LV) name identifiers 130 containing the LV names defined within a physical volume group (PVG). The number of sectors required by the LVN map 96 is determined by the maximum number of logical volumes (LVs) allowed for the logical volume group (LVG) as identified in byte string 120 of the PVG map 94.

Figure 9:
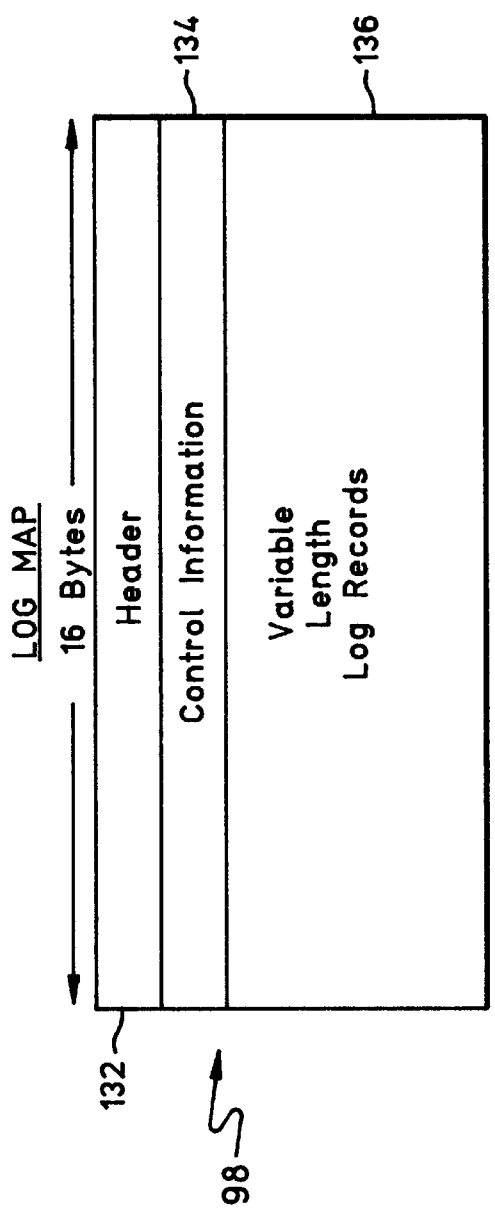
FIG. 9 illustrates a recovery log portion of the metadata table of FIG. 6.

Referring now to FIG. 9, a fully replicated LOG metadata map 98 is illustrated. In the metadata table 90, the recovery LOG map 98 includes 16 contiguous sectors of disk space. These sectors provide a recovery log containing recovery information used to insure consistent metadata. The recovery LOG map 98 includes a 16 byte header 132, 16 bytes of control information 134, and multiple bytes containing variable length log records 136.

Figure 10:
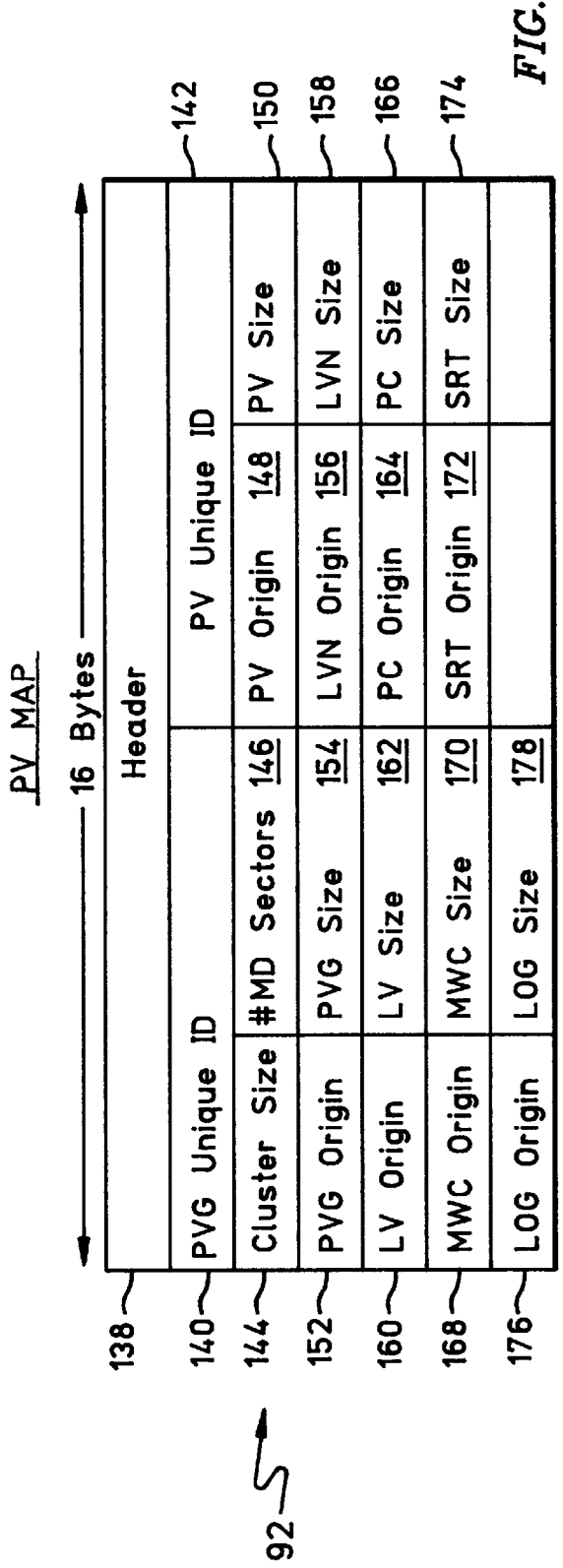
FIG. 10 illustrates a physical volume portion of the metadata table of FIG. 6.

Referring now to FIG. 10, a non-replicated PV metadata map 92 is illustrated. The PV map 92 resides in the first sector of the metadata table 90 stored on a physical volume (PV) and contains information specific to that PV, including its owning physical volume group (PVG) and the location and size of the metadata map entries residing on the device. Specifically, the PV map 92 includes a 16 byte header 138, an 8 byte identifier 140 specifying the owning PVG, an 8 byte PV unique ID identifier 142, a 4 byte cluster size identifier 144, an identifier 146 specifying the number of metadata sectors stored in the metadata table 90, a 4 byte identifier 148 specifying the origin location of the first sector of the PV map 92, a 4 byte identifier 150 specifying the size of the PV map 92, a 4 byte identifier 152 specifying origin location of the first sector of the PVG map 94, a 4 byte identifier 154 specifying the size of the PVG map 94, a 4 byte identifier 156 specifying the origin location of the first sector of the LVN map 96, a 4 byte identifier 158 specifying the size of the LVN map 96, a 4 byte identifier 160 specifying the origin location of the first sector of the LV map 100, a 4 byte identifier 162 specifying the size of the LV map 100, a 4 byte identifier 164 specifying the origin location of the first sector of the PC allocation map 102, a 4 byte identifier 166 specifying the size of the PC allocation map 102, a 4 byte identifier 168 specifying the origin location of the first sector of the MWC map 104, a 4 byte identifier 170 specifying the size of the MWC map 104, a 4 byte identifier 172 specifying the origin location of the first sector of the SRT map 106, a 4 byte identifier 174 specifying the size of the SRT map 106, a 4 byte identifier 176 specifying the origin location of the first sector of the LOG map 98, and a 4 byte identifier 178 specifying the size of the LOG map 98.

Figure 11:
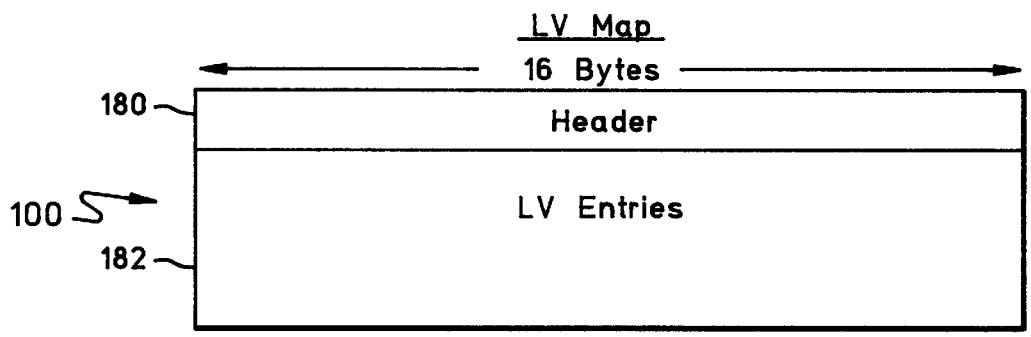
FIG. 11 illustrates a logical volume portion of the metadata table of FIG. 6.

Referring now to FIG. 11, a non-replicated LV metadata map 100 is illustrated. The LV map 100 contains a 16 byte header 180 and one or more LV map entries 182 each containing metadata information about a logical volume (LV) defined in a physical volume group (PVG). The number of sectors required by the LV map 100 is determined by the maximum number of logical volumes (LVs) allowed for the logical volume group (PVG).

Figure 12:
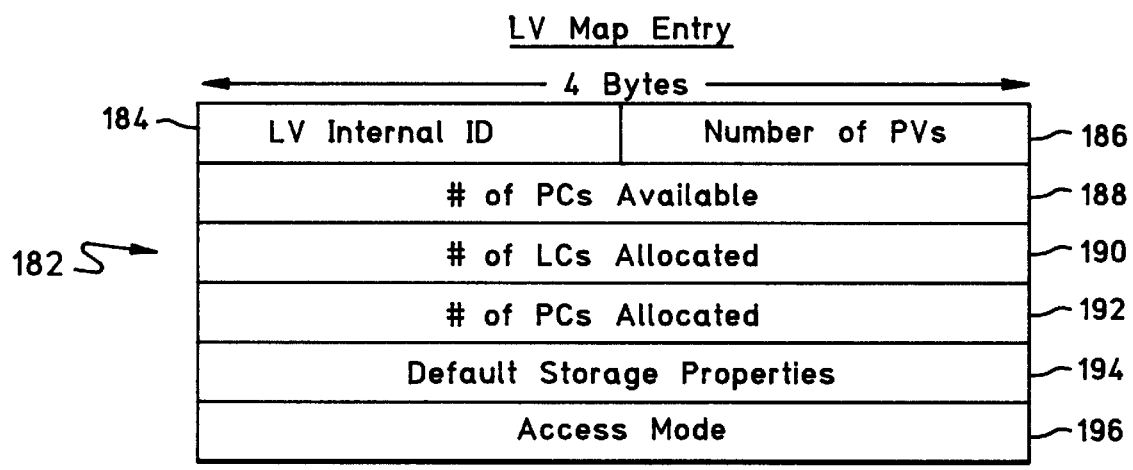
FIG. 12 illustrates an entry in the logical volume portion of FIG. 11.

FIG. 12 illustrates the contents of an LV map entry 182. The metadata information contained therein includes a 2 byte LV internal ID 184, a 2 byte identifier 186 defining the number of physical volumes (PVs) on which the LV resides, a 4 byte identifier 188 defining the number of physical clusters (PCs) available to the LV, a 4 byte identifier 190 defining the number of logical clusters (LCs) allocated to the LV, a 4 byte identifier 192 defining the number of PCs allocated to the LV, a 4 byte identifier 194 defining default storage properties for the LV, and a 4 byte identifier 196 defining the access mode used by the LV.

Figure 13:
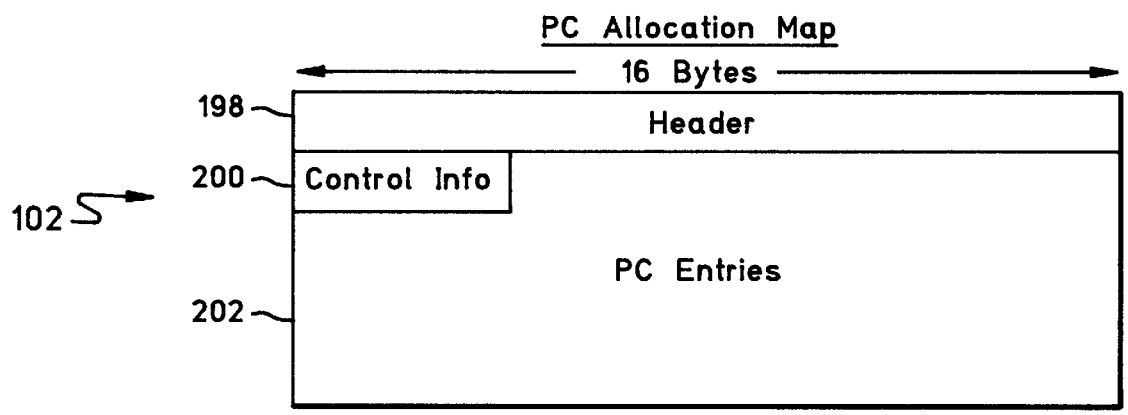
FIG. 13 illustrates a physical cluster portion of the metadata table of FIG. 6.

Turning now to FIG. 13, a non-replicated PC allocation map 102 is illustrated. The PC allocation map 102 contains a 16 byte header, a 4 byte control information identifier 200, and one or more PC allocation map entries 202 each containing metadata information about a physical cluster (PC) on the host physical volume (PV). The number of sectors required by the PC allocation map 102 is determined by the physical capacity of the disk and the cluster size defined for the physical volume group (PVG).

Figure 14:
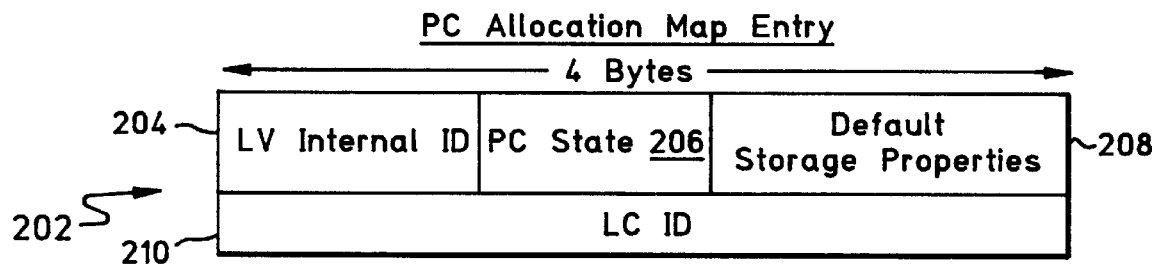
FIG. 14 illustrates an entry in the physical cluster portion of 13.

FIG. 14 illustrates the contents of a PC allocation map entry 202. The metadata information contained therein includes an owning LV internal ID 204, a PC state identifier 206, an identifier 208 defining default storage properties, and an allocated LC ID identifier 210. The PC allocation map entries 202 describe the entire disk regardless of whether the areas are LVM managed. PC allocation map entries 202 which describe non-LVM managed partitions are marked as "excluded" in the PC state identifier 206. PC entries which describe LVM-managed partitions are marked as "reserved" in the PC state identifier 206.

Figure 15:
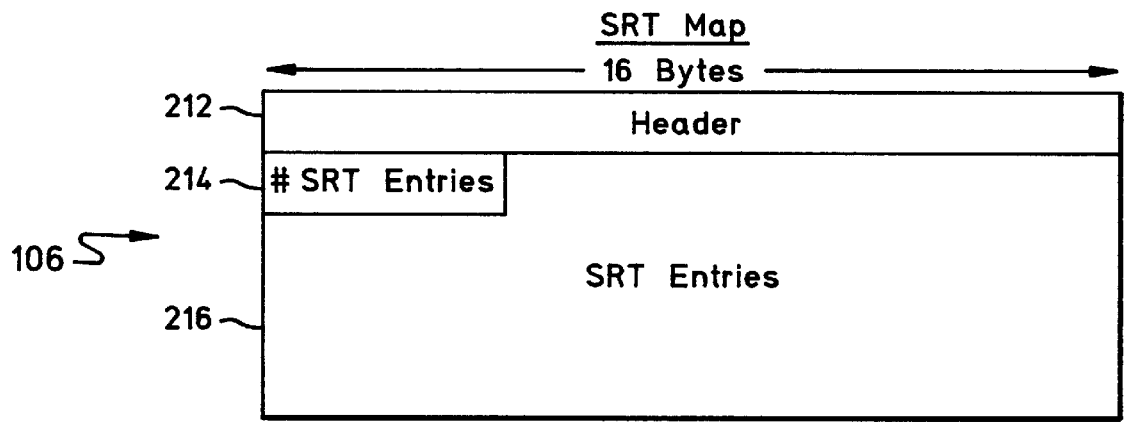
FIG. 15 illustrates a sector relocation portion of the metadata table of FIG. 6.
Figure 16:
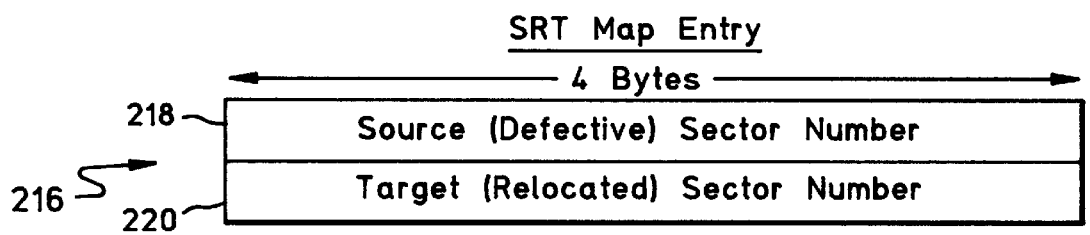
FIG. 16 illustrates an entry in the sector relocation portion of FIG. 15.

Referring now to FIG. 15, a non-replicated SRT map 106 is illustrated. The SRT map 106 consists of a 16 byte header 212, a 4 byte identifier 214 specifying the number of SRT entries, and one or more contiguous sectors which contain SRT map entries 216 that describe relocated sectors. Each SRT map entry 216, as shown in FIG. 16, contains a source (defective) sector number 218 (zero if not assigned) and a target (relocated) sector number 220. There are a total of 256 relocation entries.

The MWC map array 104 in the metadata table 90 consists of one or more contiguous sectors which contain a bit for each physical cluster (PC) on the physical volume (PV).

It will thus be seen that only a minimum of metadata is maintained in a fully replicated way across all of the physical volumes (PVs) in a physical volume group (PVG). Each physical volume group (PVG) has a globally unique identity, which is kept within each member of the PVG in a fully replicated way. The logical volume (LV) symbolic names, and a recovery log, are also maintained in a fully replicated way. Metadata information needed by a specific physical volume (PV) is maintained only on that volume. The identity of each physical volume (PV), for example, is kept in the PV for self-identification and is not replicated across all PVs. Similarly, metadata information about the logical volumes (LVs) residing on a physical volume (PV), and the physical clusters (PCs) and logical clusters (LCs) defined on that PV, is maintained only on the specified PV, where the information is needed. Each time a physical volume (PV) is added to a physical volume group (PVG), it gets an internal ID that only needs to be unique within the PVG. A PC allocation map present in each physical volume (PV) describes whether any given physical cluster (PC) belonging to the PV is allocated as a logical cluster (LC) in a logical volume (LV) by identifying the LV and the LC to which it is allocated. As described above, this is done using internal identifiers for each of the logical volumes (LVs) in the physical volume group (PVG). There is also a special code (or value), i.e., the state value 206, that represents the fact that a physical cluster (PC) is not assigned to any logical volume (LV), and hence its space is free. As described in more detail below, these identifiers are assigned when a logical volume (LV) is created and de-assigned when an LV is destroyed.

Figure 17:
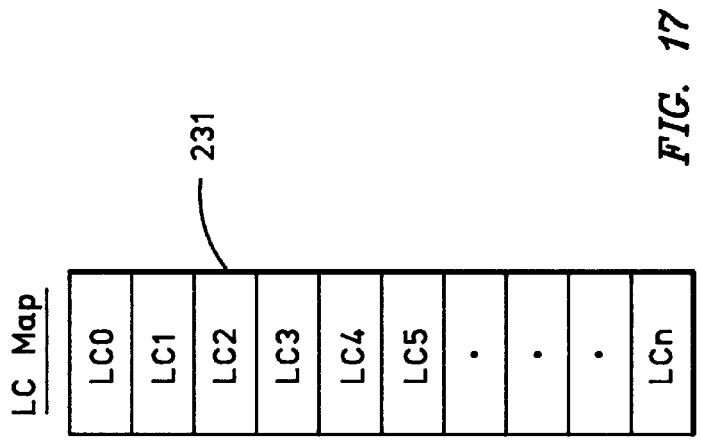
FIG. 17 illustrates a logical cluster map data structure maintained in volatile memory in accordance with the present invention.

In order to maintain a global view of all physical volumes (PVs) managed by the LVM 80, the system, during system initialization (boot) processing, retrieves the LVM metadata from each available physical volume (PV) and constructs internal data structures in the RAM 14 for each logical volume (LV) residing on the PVG. For each unique LV metadata entry, the LVM 80 constructs a logical volume control block (VolCB) structure and a Logical Cluster (LC) map 230, as shown in FIG. 17.

Figure 18:
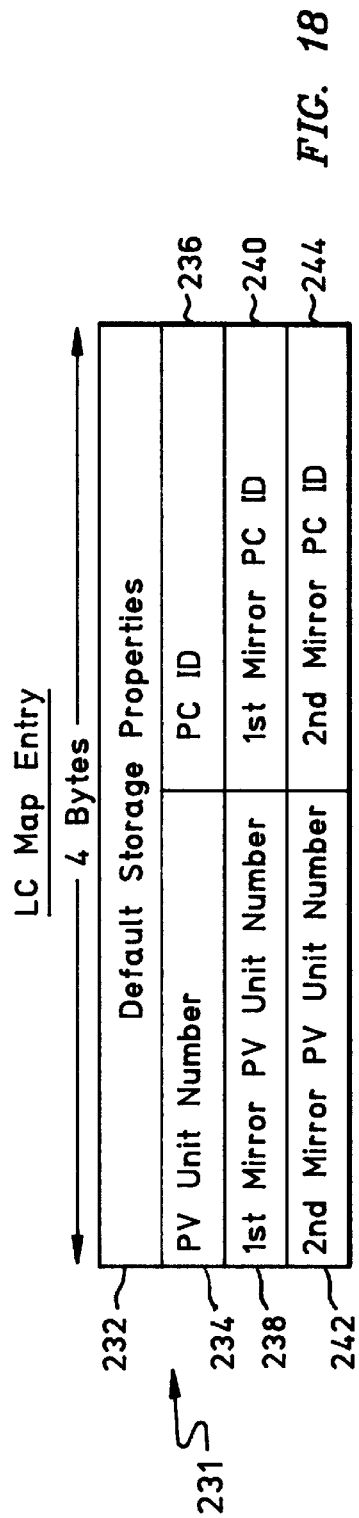
FIG. 18 illustrates an entry in the logical cluster map data structure of FIG. 17.

The logical volume control block (VolCB) structure is a logical volume (LV) control block table of the same form as the control blocks used to identify physical devices in a conventional data processing system. The LC map 230 is a sequential array of LC map entries of the form LC0, LC1, LC2 . . . LCn, as shown in FIG. 17. Each entry corresponds to a logical cluster (LC). An individual LC map entry 231 is illustrated in FIG. 18. The LC map entry 231 identifies the physical volume (PV) and physical cluster (PC) to which a single logical cluster (LC) is allocated. The size of the LC map 230 is determined by the LCInUse value 190 in the LV map 100. As shown in FIG. 18, the LC map entry 231 includes plural byte strings containing default storage property information 232, a PV unit number 234, a PC ID value 236, a 1st mirror PV unit number 238, a 1st mirror PC ID value 240, a 2nd mirror PV unit number 242, and a 2nd mirror PC ID value 244. The PV unit number identifies the physical volume (PV) metadata required to identify the PV on which a logical cluster is located, and the PC ID value is the relative position of the corresponding PC entry within the PC allocation map 102.

FIGS. 19–21 are flow diagrams that illustrate a computer program. The computer program includes software that is compiled, assembled, and stored as ones and zeros on a storage device such as one or more disks in the disk drive 20. The computer program is conventionally loaded into the programmed, general purpose computer of FIG. 1. When so loaded, the computer program controls the operations of the digital computer, causing it to perform the steps of FIGS. 19–21. When stored on a disk, in any equivalent storage device, or in a node of a networked computer system, the invention is embodied as a computer program product.

FIG. 19 is a flow diagram that illustrates the initialization procedure performed by the LVM 80 for generating an LC map data structure 230 as described above. In a first step 250, the LVM 80 selects a first physical volume (PV) in a physical volume group (PVG) and marks it as the current PV. In a second step 252, the LVM 80 reads the metadata information maintained therein, particularly the PC allocation map 102 identifying the logical clusters (LCs) allocated to each of the physical clusters (PCs) on the physical volume (PV), if any. Each physical cluster (PC) entry of the current physical volume (PV) is read in the PC metadata table 102, and each PC having a logical cluster (LC) allocated thereto is identified. For each allocated logical cluster (LC), the corresponding location in the LC map 230 is accessed and the associated physical cluster (PC) information from the PC metadata table 102 is placed therein. In a third step 254, the LVM 80 moves on and consults the next physical volume (PV) in the physical volume group (PVG) and marks it as the current PV. If in step 256 all of the physical volumes (PVs) in the physical volume group (PVG) have been read, the initialization procedure terminates in step 258. If not, the initialization procedure returns to step 252 and the current physical volume (PV) is processed.

Upon completion of the initialization processing, the LVM 80 exports the logical volume control blocks (VolCBs) for subsequent mount processing and drive letter assignment. At this point, an LVM logical volume (LV) appears to the system as any traditional disk partition. Higher level services such as file systems and data managers access data within a logical volume (LV) via a relative block address (RBA). The RBA is the sector number relative to the origin of the logical volume (LV).

FIG. 20 is a flow diagram that illustrates a procedure by which the LVM 80 translates an RBA value 260 to an absolute sector number 266 on a physical volume (PV) 264. From an LVM logical volume (LV), the RBA value 260 is mapped to a logical cluster (LC) entry 231 in the LC map 230 and then to an absolute sector 266 on the physical volume (PV) 264. The address of the logical cluster (LC) entry 231 in the LC map 230 is determined by the formula, LC=RBA div ClusterSize, where ClusterSize is the number of sectors per logical cluster in the physical volume group (PVG). The ClusterSize information is found in byte string 114 of the PVG map 94, shown in FIG. 7. The LC map 230 is consulted using the identified logical cluster (LC) address to identify the corresponding physical volume (PV) unit number and physical cluster (PC) ID. This information is found in byte strings 234 and 236 of the LC map entry 231. The sector within the physical cluster identified by PC ID is determined by the formula, Sector=PC ID * ClusterSize+ RBA mod ClusterSize. The absolute sector 266 within the physical volume (PV) 264 can thus be computed.

Turning now to FIG. 21, a flow diagram is illustrated that represents a preferred procedure performed by the LVM 80 for allocating additional physical clusters (PCs) to a logical volume (LV). The PC allocation map 102 present in each physical volume (PV) describes whether any given physical cluster (PC) belonging to a PV is allocated to a logical volume (LV). The LV identifier information contained in the PC allocation map 102 is assigned when a logical volume (LV) is created and de-assigned when an LV is destroyed. There is also the special state value that can be entered in the byte string 206 of the PC allocation map 102, which represents the fact that a physical cluster (PC) is not assigned to any logical volume, and hence its space is free. When a physical cluster (PC) is allocated to a logical volume (LV), only one PC allocation map entry is modified; namely, the one in the physical volume (PV) where the PC resides. Thus, the fact that a physical cluster (PC) is allocated to a logical volume (LV) is recorded in only one physical volume (PV).

In accordance with FIG. 21, a first step 270 in the allocation procedure is an allocation request to the LVM 80 for N physical clusters (PCs) to be added to an existing logical volume (LV). In step 272, the LVM 80 consults the PC allocation map 102 on each physical volume (PV), and specifically the state value 206, to determine whether there are N physical clusters (PCs) free in the physical volume group (PVG). If not, the LVM 80 fails the allocation request in step 274. If there are N physical clusters available, the LVM 80, in step 276, allocates as many physical clusters as possible from the physical volume (PV) designated as current. In step 278, the LVM 80 tests whether additional physical clusters are still needed. If not, the allocation procedure terminates in step 280. If additional physical clusters (PCs) are needed, the LVM 80 moves to the next physical volume (PV) in step 282 and marks it as current. The process then returns to step 276. When a deallocation request is made, the foregoing process is reversed by consulting the PC map 230 to identify N logical clusters to be deallocated, and deallocating corresponding physical clusters (PCs) pointed to by the LC map entries 231.

In summary then, logical volume management in accordance with the above-described preferred embodiment of the present invention is achieved through the use of appropriate data structures kept in volatile storage and others kept on the physical repositories, and through appropriate procedures that manipulate these data structures. The allocation information for a given logical unit of undivided storage is stored in a partitioned way without replicating it. To piece the parts together, volatile data structures are kept to track allocations. These volatile data structures are built at initialization time from the metadata on the physical devices. In most instances, whenever space is allocated or deallocated, only one physical repository need be updated. It is necessary to update more than one physical repository only when a new repository is required to allocate space for an undivided region, or when an undivided region ceases to have allocation in a physical repository. To track all the allocated parts of a logical unit of undivided storage, a method of the invention generates and tracks in a fully-replicated way unique internal identifiers for each such entity, and a count of how many physical storage devices contain allocation for the entity.

The ability to avoid storing all allocation information in a fully-replicated way, as in conventional systems, allows the above-described invention to provide the high-level function of logically undivided storage while using minimal space to store the allocation information. It also allows simpler administration procedures that can update the metadata quickly, and more hardware devices can be administered without performance penalties. All space administration activities directed to data residing in operational physical storage devices proceeds normally, even if some storage devices that contain parts of an undivided region of storage are unavailable.

Another advantage of maintaining device-specific allocation information only on the device in question is that data stored within a logical unit of undivided storage can be accessed in the normal mode of operation whenever the physical devices in which the data is stored are operational. It is also possible to detect when an undivided region of storage is incomplete due to an unavailable device, and report those errors back to the requester of the data.

In conventional systems where allocation information is fully replicated, access to data in a logical unit of undivided storage proceeds in a degraded mode when any of the physical devices are not operational. For example, when data is written to a logical unit of undivided storage, it is typically mirrored by making two copies of the stored data. If a conventional system detects nonoperational physical devices, it proceeds in a degraded mode to avoid writing mirrored data to the nonoperational devices. In this invention, normal write mode operations are possible because a system will only mirror data to known operational devices. The presence of nonoperational devices can be monitored by the LVM 80 in a variety of ways, but is preferably done by making an appropriate entry (i.e., setting a flag) in the LC map 230 maintained in RAM 14. Alternatively, a separate data structure identifying operational and nonoperational devices could be created and checked by the LVM 80 whenever read/write operations are initiated. When data is to be written, any logical clusters corresponding to errant physical devices can be avoided. When data is to be read, the read operation can proceed normally if the data resides on operational devices, and an error message can be returned to the caller if the data lies on nonoperational devices.

Accordingly, a system, method and computer program product for logical volume management with enhanced update performance capability and increased data availability have been described. While various embodiments have been disclosed, it should be apparent that many variations and alternative embodiments would be apparent to those skilled in the art in view of the teachings herein. It is understood, therefore, that the invention is not to be in any way limited except in accordance with the spirit of the appended claims and their equivalents.

We claim:

1. In a programmed, general purpose digital computer having a memory and coupled to data storage devices, a logical volume manager having computer software operative for:

creating a logical unit of undivided storage;

allocating portions of said data storage devices to said logical unit of undivided storage;

storing metadata on said data storage devices containing information about portions of said data storage devices that have been allocated to said logical unit of undivided storage;

automatically changing the size of said logical unit of undivided storage whereby portions of said data storage devices are allocated to or deallocated from said logical unit of undivided storage; and updating said metadata after automatically changing the size of said logical unit of undivided storage and only on said data storage devices affected by the automatic change of size.

2. The logical volume manager of claim 1 wherein said computer software is further operative for constructing a map in said memory for translating between addresses in said logical unit of undivided storage and locations on said storage devices.

3. The logical volume manager of claim 1 wherein said computer software is further operative for constructing a data structure in said memory containing information derived from said metadata on each of said data storage devices.

4. The logical volume manager of claim 3 wherein said computer software is further operative for updating said data structure in said memory following operation of said means for automatically changing the size of said logical unit of undivided storage.

5. The logical volume manager of claim 1 wherein said metadata includes global metadata stored on each of said storage devices and local metadata unique to each of said data storage devices, and wherein said computer software is further operative for updating only said local metadata.

6. The logical volume manager of claim 5 wherein said computer software is further operative for defining said data storage devices as physical volumes that are part of a physical volume group and for defining each physical volume as a plurality of physical clusters, and wherein said computer software is further operative for defining said logical unit of undivided storage as a logical volume having a plurality of logical clusters corresponding to one or more of said physical clusters in one or more of said physical volumes of a single physical volume group.

7. The logical volume manager of claim 6 wherein said global metadata includes a physical volume group metadata map, a logical volume symbolic name map and a recovery log map.

8. The logical volume manager of claim 6 wherein said local metadata includes a physical volume metadata map, a logical volume metadata map, a physical cluster metadata map, a mirror write consistency bit array map, and a sector relocation map.

9. The logical volume manager of claim 6 wherein said computer software is further operative for constructing a map in said memory for translating between addresses in said logical volume and storage locations on said physical volumes.

10. The logical volume manager of claim 9 wherein said map in said memory is a relative block address map for mapping a sector number relative to an origin of a logical volume to an absolute sector number on a physical volume.

11. A method for managing logical volumes executed by a programmed, general purpose digital computer having a memory and coupled to data storage devices, said method comprising the steps of:

creating a logical unit of undivided storage;

allocating portions of said data storage devices to said logical unit of undivided storage;

storing metadata on said data storage devices containing information about portions of said data storage devices that have been allocated to said logical unit of undivided storage;

automatically changing the size of said logical unit of undivided storage whereby portions of said data storage devices are allocated to or deallocated from said logical unit of undivided storage; and updating said metadata following operation of said step of automatically changing the size of said logical unit of undivided storage, said step of updating said metadata operating only on said data storage devices affected by said step of automatically changing the size of said logical unit of undivided storage.

12. The method of claim 11 further comprising the step of constructing a map in said memory for translating between addresses in said logical unit of undivided storage and locations on said data storage devices.

13. The method of claim 11 further comprising the step of constructing a data structure in said memory containing information derived from said metadata on each of said data storage devices.

14. The method of claim 13 further comprising the step of updating said data structure in said memory following operation of said step of automatically changing the size of said logical unit of undivided storage.

15. The method of claim 11 wherein said metadata includes global metadata stored on each of said data storage devices and local metadata unique to each of said data storage devices, and wherein only said local metadata is updated by said step of updating said metadata following operation of said step of automatically changing the size of said logical unit of undivided storage.

16. The method of claim 15 further comprising the step of defining said data storage devices as physical volumes that are part of a physical volume group and for defining each physical volume as a plurality of physical clusters, and said method further comprising the step of defining said logical unit of undivided storage as a logical volume having a plurality of logical clusters corresponding to one or more of said physical clusters in one or more of said physical volumes of a single physical volume group.

17. The method of claim 16 wherein said global metadata includes a physical volume group metadata map, a logical volume symbolic name map and a recovery log map.

18. The method of claim 16 wherein said local metadata includes a physical volume metadata map, a logical volume metadata map, a physical cluster metadata map, a mirror write consistency bit array map, and a sector relocation map.

19. The method of claim 16 further including the step of constructing a map in said memory for translating between addresses in said logical volume and storage locations on said physical volumes.

20. The method of claim 19 wherein said map in said memory is a relative block address map for mapping a sector number relative to an origin of a logical volume to an absolute sector number on a physical volume.

21. A computer program product for use in a programmed, general purpose digital computer having a memory and coupled to data storage devices, said computer program product comprising:

a data storage medium;

software recorded on said data storage medium and executable for creating a logical unit of undivided storage;

software recorded on said data storage medium and executable for allocating portions of said data storage devices to said logical unit of undivided storage;

software recorded on said data storage medium and executable for storing metadata on said data storage devices containing information about portions of said data storage devices that have been allocated to said logical unit of undivided storage;

software recorded on said data storage medium and executable for automatically changing the size of said logical unit of undivided storage whereby portions of said data storage devices are allocated to or deallocated from said logical unit of undivided storage; and software recorded on said data storage medium and executable for updating said metadata after automatically changing the size of said logical unit of undivided storage and only on said data storage devices affected by the automatic change of size.

22. The computer program product of claim 21 further comprising software recorded on said data storage medium and executable for constructing a map in said memory for translating between addresses in said logical unit of undivided storage and locations on said data storage devices.

23. The computer program product of claim 21 further comprising software recorded on said data storage medium and executable for constructing a data structure in said memory containing information derived from said metadata on each of said data storage devices.

24. The computer program product of claim 23 further comprising software recorded on said data storage medium and executable for updating said data structure in said memory after automatically changing the size of said logical unit of undivided storage.

25. The computer program product of claim 21 wherein said metadata includes global metadata stored on each of said data storage devices and local metadata unique to each of said data storage devices, and wherein only said local metadata is updated by said software executable for updating said metadata.

26. The computer program product of claim 25 further comprising software recorded on said data storage medium and executable for defining said data storage devices as physical volumes that are part of a physical volume group and for defining each physical volume as a plurality of physical clusters, and said computer program product further comprising software recorded on said data storage medium and executable for defining said logical unit of undivided storage as a logical volume having a plurality of logical clusters corresponding to one or more of said physical clusters in one or more of said physical volumes of a single physical volume group.

27. The computer program product of claim 26 wherein said global metadata includes a physical volume group metadata map, a logical volume symbolic name map and a recovery log map.

28. The computer program product of claim 26 wherein said local metadata includes a physical volume metadata map, a logical volume metadata map, a physical cluster metadata map, a mirror write consistency bit array map, and a sector relocation map.

29. The computer program product of claim 26 further including software executable for constructing a map in said memory for translating between addresses in said logical volume and storage locations on said physical volumes.

30. The computer program product of claim 29 wherein said map in said memory is a relative block address map for mapping a sector number relative to an origin of a logical volume to an absolute sector number on a physical volume.

* * * * *